Nov. 8, 1927.  
A. W. RYBECK  
1,648,151  
LIQUID MEASURING APPARATUS  
Filed Jan. 20, 1923

Witness:  
R. Burkhardt

Inventor  
Adolph W. Rybeck,  
By Wilkinson, Huxley, Byron & Knight  
Attys.

Patented Nov. 8, 1927.

1,648,151

UNITED STATES PATENT OFFICE.

ADOLPH W. RYBECK, OF MILWAUKEE, WISCONSIN, ASSIGNOR TO THE T. L. SMITH COMPANY, OF MILWAUKEE, WISCONSIN, A CORPORATION OF WISCONSIN.

LIQUID-MEASURING APPARATUS.

Application filed January 20, 1923. Serial No. 614,051.

This invention relates to a new and improved liquid measuring apparatus and more particularly to an apparatus of this kind adapted to selectively limit the liquid discharged from a liquid-holding reservoir or tank.

In a number of mechanical operations it is desirable to provide the discharge of uniform quantities of liquid at intervals. A particular example of such use is in connection with the use of concrete mixers. These mixers of the usual type make successive batches which consist of a definite quantity of solid materials together with a definite quantity of water. To provide a uniform mixture, the amount of water discharged into the mixer must be controllable within certain limits and must be uniform for successive batches.

The water is commonly run into a tank of definite capacity from any usual water source and the tank is emptied into the mixer rapidly through a large pipe connection. However, with mixtures of differing consistencies forming concrete to be used for various purposes, it is desirable to be able to vary the amount of water added to each batch. In some circumstances, the batches may not be of the full capacity of the machine in which case less water than the capacity of the tank will be required. The water must be added quickly, and for efficient operation of the mixing machinery, the water measurement must be substantially automatic in action since the operator is otherwise occupied and cannot measure the quantity of water for each batch.

It is an object of the present invention to provide liquid measuring apparatus adapted to be associated with a fluid tank and to govern the amount of liquid flowing from the tank.

It is also an object to provide apparatus of this character which governs the flow from the tank by retaining within the tank a quantity of the liquid contained therein, this retained quantity being variable at the will of the operator with consequent variation in the amount delivered.

It is a further object to provide liquid measuring apparatus of this type which is simple in design and operation and which is capable of easy and rapid adjustment.

It is an additional object to provide a construction which is simple in design and adapted for commercial manufacture at relatively small cost.

Other and further objects will appear as the description proceeds.

I have illustrated a preferred embodiment of my invention in the accompanying drawings, in which—

Figure 6:
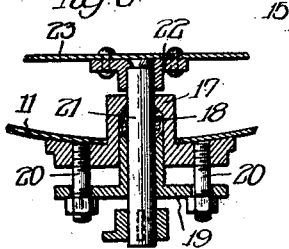
Figure 6 is a fragmentary section taken on line 6—6 of Figure 4.
Figure 7:
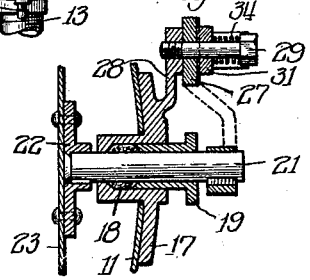
Figure 7 is a fragmentary section taken on line 7—7 of Figure 4.

The main or first tank 11 may be of any desired capacity and is provided with the inlet 12 which may also serve as a connection for a relief valve, outlet connection 13, and the connections 14 and 15, which latter may be connected to a gauge of usual type. The trunnion bearing 16 is secured inside one end of the tank and the trunnion bearing 17 is secured in the opposite end of the tank. This bearing 17, as shown in detail in Figure 6, provides a chamber for the packing 18 retained in place by the gland or follower 19, the latter being secured by bolts 20. The shaft or trunnion 21 passes through the bearing 17 and is secured by member 22 to the inner or second tank 23. The opposite end of the tank 23 is supported upon trunnion 24 in trunnion bearing 16.

Figure 1:
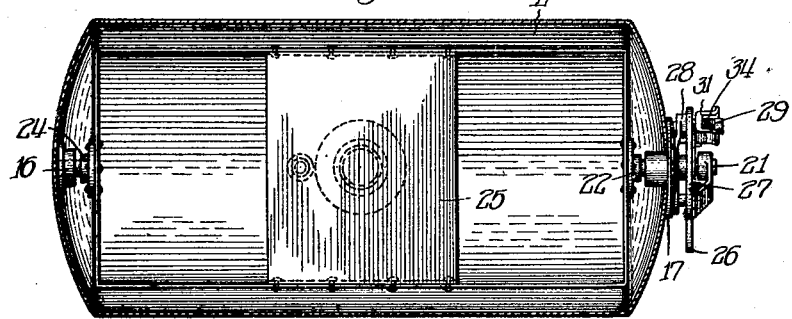
Figure 1 is a plan view of the apparatus, the upper portion of the tank being cut away.
Figure 2:
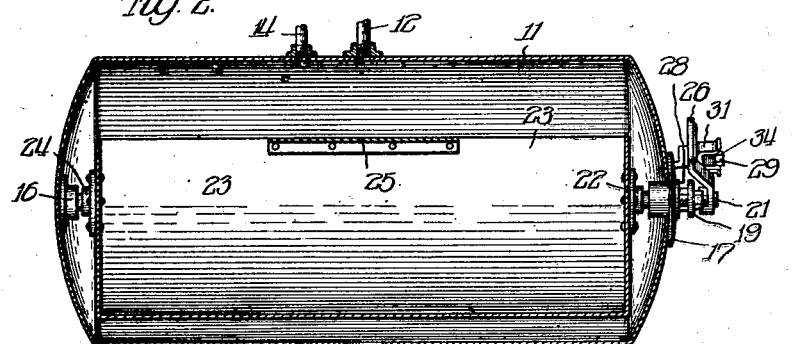
Figure 2 is a vertical section, certain parts being shown in elevation.
Figure 5:
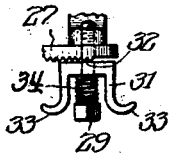
Figure 5 is a fragmentary detail showing the locking mechanism.
Figure 3:
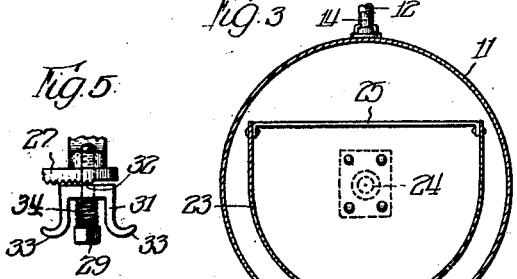
Figure 3 is a transverse section.
Figure 4:
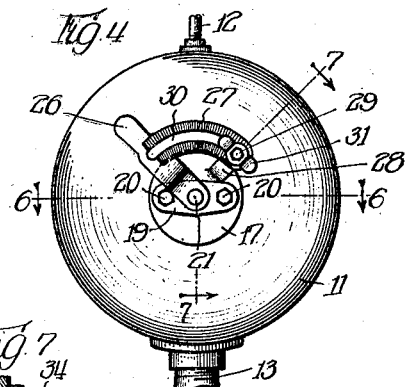
Figure 4 is an end view taken from the right end of Figure 1.

The tank 23 is in the form of an open trough, as best shown in Figure 3. The central portion of the top of the trough is closed by the plate 25 which plate covers the space located in alignment with the inlet opening 12. The lever 26 is keyed to the shaft 21 and is provided with the slotted arc 27, the arc being provided upon its outer face with serrations as shown in detail in Figure 5.

The arm 28 extends from the member 17 and carries the bolt 29 which passes through the slot 30 in the arc 27. The bolt 29 carries the detent 31 provided with projections 32 adapted to interfit with the serrations upon the arc 27. The detent 31 is provided with the finger grips 33 and is maintained pressed against the arc 27 by means of the spring 34 which is fitted upon bolt 29.

It will be understood that valves will control the inlet 12 and discharge pipe 13, these valves being operated in the customary manner and forming no part of the present invention. With the main tank filled and the inner tank located in the position in which it is shown in Figure 3, upon opening the valve in the discharge pipe 13, only that portion of the contents of the main tank in excess of the capacity of the second tank will be discharged. The second tank will remain full of the liquid. With the inner tank in this position, the minimum capacity of the apparatus is had.

With the inner tank rotated 90°, this tank will retain no liquid whatever and the complete contents of the outer tank will be discharged. By variation in the position of the inner tank at any point between these two limiting positions, the quantity of liquid delivered may be placed at any point between the two limiting quantities.

This adjustment is quickly accomplished by pulling out the detent 31 and rotating the inner tank by means of lever 36. When placed in the desired position, the detent is released and its projections 32 engage the serrations upon the arc 27 and lock the inner tank in the desired position.

I have shown one preferred embodiment of my invention by way of illustration, but I contemplate such changes and modifications to meet varying conditions as may come within the scope of the appended claims.

I claim:

1. In combination with a fluid tank, a secondary tank supported upon trunnions in the first tank, said secondary tank being rotatable upon its trunnions to vary its containing capacity, the secondary tank being so related to its trunnions as to maintain the center of gravity of its contents below the axis of the trunnions.

2. In combination with a fluid tank, a secondary tank movably supported within said first tank, said secondary tank being adjustable to vary its containing capacity, an inlet opening in the first tank, and a cover member over that portion of the second tank in approximate alignment with the inlet.

Signed at Milwaukee, Wisconsin, this 9th day of January, 1923.

ADOLPH W. RYBECK.